US010329881B1

(12) United States Patent
Saleri et al.

(10) Patent No.: US 10,329,881 B1
(45) Date of Patent: Jun. 25, 2019

(54) COMPUTERIZED METHOD AND SYSTEM FOR IMPROVING PETROLEUM PRODUCTION AND RECOVERY USING A RESERVOIR MANAGEMENT FACTOR

(71) Applicant: QRI GROUP, LLC, Houston, TX (US)

(72) Inventors: Nansen G. Saleri, Houston, TX (US); Robert M. Toronyi, Danville, CA (US); Joseph W. Ault, Moraga, CA (US); Cromwell D. Wong, Houston, TX (US)

(73) Assignee: QRI GROUP, LLC, Houston, TX (US)

( * ) Notice: Subject to any disclaimer, the term of this patent is extended or adjusted under 35 U.S.C. 154(b) by 118 days.

(21) Appl. No.: 15/408,397

(22) Filed: Jan. 17, 2017

Related U.S. Application Data

(63) Continuation of application No. 13/282,315, filed on Oct. 26, 2011, now abandoned.

(51) Int. Cl.
*G06F 17/18* (2006.01)
*E21B 41/00* (2006.01)
*E21B 49/00* (2006.01)
*E21B 49/08* (2006.01)

(52) U.S. Cl.
CPC .......... *E21B 41/0092* (2013.01); *E21B 49/00* (2013.01); *E21B 49/08* (2013.01); *G06F 17/18* (2013.01)

(58) Field of Classification Search
CPC .......... G06Q 10/00; G06Q 40/00; G06F 17/60
USPC ...................................... 705/7.11
See application file for complete search history.

(56) References Cited

U.S. PATENT DOCUMENTS

| 3,035,440 | A | 5/1962 | Reed |
| 5,984,010 | A | 11/1999 | Elias et al. |
| 6,101,447 | A | 8/2000 | Poe |
| 7,079,952 | B2 * | 7/2006 | Thomas ................. E21B 43/14 |
| | | | 702/13 |
| 7,289,942 | B2 | 10/2007 | Yang et al. |
| 7,445,041 | B2 | 11/2008 | O'Brien |
| 7,556,099 | B2 | 7/2009 | Arthur et al. |

(Continued)

OTHER PUBLICATIONS

U.S. Appl. No. 14/836,564, filed Aug. 26, 2015, Mondal et al.
(Continued)

*Primary Examiner* — Romain Jeanty
(74) *Attorney, Agent, or Firm* — Workman Nydegger

(57) ABSTRACT

Determining a Reservoir Management Factor™ (RMF™ or β) for a petroleum producer provides a novel metric, selection, design, implementation and monitoring tool designed for use in implementing capital projects for increasing production and reserves of the petroleum producer. The RMF or β can be determined according to the following equation:

β=sum of regression coefficients=sum of (reserves coefficient, production coefficient)

wherein,
reserves coefficient=the coefficient of the petroleum producer's reserves; and
production coefficient=the coefficient of the petroleum producer's production.

The producer can based on the RMF, select, design, implement and monitor one or more capital projects for increasing production and reserves of the petroleum producer. The capital projects can include drilling additional wells, stimulating existing wells, and increasing reservoir contact of existing wells.

20 Claims, 6 Drawing Sheets

(56) References Cited

U.S. PATENT DOCUMENTS

| | | |
|---|---|---|
| 7,798,219 B1 | 9/2010 | Harnoy |
| 7,890,264 B2 | 2/2011 | Elphic |
| 7,963,327 B1 | 6/2011 | Saleri et al. |
| 8,145,427 B1 | 3/2012 | Saleri et al. |
| 8,145,428 B1 | 3/2012 | Saleri et al. |
| 8,195,401 B2 | 6/2012 | Ella et al. |
| 8,209,202 B2 | 6/2012 | Narayanan et al. |
| 8,396,826 B2* | 3/2013 | Mijares ............... E21B 43/00 706/61 |
| 8,880,422 B1 | 11/2014 | Lehmann et al. |
| 2001/0015133 A1 | 8/2001 | Sakai et al. |
| 2001/0037983 A1 | 11/2001 | Takahashi et al. |
| 2002/0013687 A1 | 1/2002 | Ortoleva |
| 2002/0120429 A1 | 8/2002 | Ortoleva |
| 2002/0165671 A1* | 11/2002 | Middya ............... E21B 43/00 702/12 |
| 2003/0225606 A1 | 12/2003 | Raghuraman et al. |
| 2004/0015376 A1 | 1/2004 | Zhu et al. |
| 2004/0158406 A1 | 8/2004 | Harrison |
| 2004/0220846 A1 | 11/2004 | Cullick |
| 2005/0038603 A1 | 2/2005 | Thomas et al. |
| 2005/0149307 A1 | 7/2005 | Gurpiner et al. |
| 2005/0209912 A1 | 9/2005 | Venningen et al. |
| 2006/0224369 A1 | 10/2006 | Yang et al. |
| 2006/0289157 A1 | 12/2006 | Rao |
| 2007/0016389 A1 | 1/2007 | Ozgen |
| 2007/0028417 A1 | 2/2007 | Crichlow |
| 2007/0118346 A1* | 5/2007 | Wen ............... E21B 43/00 703/10 |
| 2007/0143025 A1 | 6/2007 | Valdez et al. |
| 2007/0179768 A1* | 8/2007 | Cullick ............... E21B 43/00 703/10 |
| 2007/0284107 A1 | 12/2007 | Crichlow |
| 2008/0052097 A1 | 2/2008 | Bouzas et al. |
| 2008/0091283 A1 | 4/2008 | Balci et al. |
| 2008/0252898 A1 | 10/2008 | Pfaff |
| 2008/0262898 A1 | 10/2008 | Tonchev et al. |
| 2009/0005630 A1 | 1/2009 | Yokoyama et al. |
| 2009/0037115 A1 | 2/2009 | Magill et al. |
| 2009/0084545 A1 | 4/2009 | Banerjee et al. |
| 2009/0133871 A1 | 5/2009 | Skinner et al. |
| 2009/0313772 A1 | 12/2009 | Talley |
| 2010/0042458 A1* | 2/2010 | Rashid ............... E21B 43/122 703/10 |
| 2010/0057418 A1 | 3/2010 | Li et al. |
| 2010/0082142 A1 | 4/2010 | Usadi et al. |
| 2010/0204972 A1 | 8/2010 | Hsu et al. |
| 2010/0300682 A1 | 12/2010 | Thakur et al. |
| 2011/0014088 A1 | 1/2011 | Zubrin et al. |
| 2011/0054869 A1 | 3/2011 | Li |
| 2011/0067443 A1 | 3/2011 | Martinez et al. |
| 2011/0168391 A1 | 7/2011 | Saleri et al. |
| 2011/0290479 A1* | 12/2011 | Izgec ............... E21B 43/16 166/250.02 |
| 2012/0101759 A1 | 4/2012 | Rai et al. |
| 2012/0232865 A1 | 9/2012 | Maucec et al. |
| 2012/0292055 A1 | 11/2012 | Swist |
| 2013/0048279 A1 | 2/2013 | Appel et al. |
| 2013/0110474 A1 | 5/2013 | Saleri et al. |
| 2013/0110524 A1 | 5/2013 | Saleri et al. |
| 2013/0110563 A1 | 5/2013 | Saleri |
| 2013/0110571 A1 | 5/2013 | Saleri et al. |
| 2013/0151159 A1 | 6/2013 | Pomerantz et al. |
| 2013/0161502 A1 | 6/2013 | Pomerantz et al. |
| 2013/0218538 A1* | 8/2013 | Fuecker ............... G06F 17/5018 703/2 |
| 2013/0338987 A1 | 12/2013 | Cheng et al. |
| 2015/0337631 A1 | 11/2015 | Matringe et al. |
| 2015/0346010 A1 | 12/2015 | Matringe et al. |

OTHER PUBLICATIONS

U.S. Appl. No. 15/299,828, filed Oct. 21, 2016, Saleri et al.

Batavia, "Front-End Loading for Life Cycle Success", Offshore Technology Conference Paper No. OTC-12980; Published Apr. 2001.

BDM-Oklahoma, Inc., "Feasability Study of Heavy Oil Recovery in the United States", U.S. Department of Energy, Document No. NIPER/BDM-0225; Published Mar. 1995.

Burns et al., "Gas Field Development: Automatic Selection of Locations for New Producing Wells", Society of Petroleum Engineers, Document No. SPE-2429; Published 1969.

Cordazzo et al., "Interblock Transmissibility Calculation Analysis for Petroleum Reservoir Simulation", Federal University of Santa Catarina, Nov. 2002, pp. 1-18.

Fiksel et al., "Measuring Progress Towards Sustainability Principles, Process, and Best Practices", 1999 Greening of Industry Network Conference Best Practice Proceedings.

Freudenrich, Ph.D., Craig, and Jonathan Strickland, "How Oil Drilling Works" Apr. 12, 2001. HowStuffWorks.com retrieved from WayBack Machine, http://web.archive.org/web/20060418040616/http://science.howstuffworks.com/oil-drilling.htm/printable.

Graf et al., "Candidate Selection Using Stochastic Reasoning Driven by Surrogate Reservoir Models"; Society of Petroleum Engineers, Document No. SPE-136373; SPE Reservoir Evaluation and Engineering; Published Aug. 2011; p. 433-442.

Ham, Jerry, Ranking of Texas Reservoirs for Application of Carbon Dioxide Miscible Displacement, Apr. 1996.

Heiman, "The Octopus", Forbes Energy & Genius, pp. 454-551, Nov. 24, 2008.

Investopedia.com, "What are leading, lagging, and coincident indicators? What are they for?", http://www.investopedia.com/ask/answers/177.asp, retrieved on Feb. 27, 2012

Investorwords.com, "lagging indicator", "leading indicator", http://www.investorwords.com/2713/lagging_indicator.html, http://www.investorwords.com/2741/leading_indicator.html.

Izgec et al, "Quantifying Reservoir Connectivity, In-Place Volumes, and Drainage-Area Pressures during Primary Depletion"; Elsevier, 2009; Journal of Petroleum Science and Engineering, vol. 69; p. 7-17.

Jolley et al., Reservoir Compartmentalization: An Introduction; Reservoir Compartmentalization; The Geological Society of London, 2010; Special Publications vol. 347; pp. 1-8.

Kabir et al., "Diagnosis and Reservoir Compartmentalization from Measured Pressure/Rate Data during Primary Depletion"; Elsevier, 2009; Journal of Petroleum Science and Engineering, vol. 69, pp. 271-282.

McElroy, "Transient Pressure Analysis in Strip Reservoirs with Linear Skin Discontinuities", Stanford University, 1986, p. 1-58.

"The Report of The BP U.S. Refiners Independent Safety Review Panel", Jan. 2007.

Rivas et al., "Ranking Reservoirs for Carbon Dioxide Flooding Processes", 1994.

Saleri et al., "Engineering Control in Reservoir Simulation: Parts I and II", SPE 18305, 1988.

Saleri et al., "Data and Data Hierarchy", SPE 21369, pp. 1286-1293, Dec. 1992.

Saleri, "Reservoir Performance Forecasting: Acceleration by Parallel Planning", JPT, pp. 652-657, Jul. 1993.

Saleri, "'Learning' Reservoirs: Adapting to Disruptive Technologies", JPT, pp. 57-60, Mar. 2002.

Saleri et al., "The Expanding Role of the Drill Bit in Shaping the Subsurface", JPT, pp. 53-58, Dec. 2003.

Saleri et al., "Shaybah-220: A Maximum-Reservoir-Contact (MRC) Well and Its Implications for Developing Tight-Facies Reservoirs", SPE Reservoir Evaluation & Engineering, pp. 316-320, Aug. 2004.

Saleri, "Reservoir Management Tenets: Why They Matter to Sustainable Supplies", JPT, pp. 28-30, Jan. 2005.

Saleri, "Tenets and Diagnostics in Modern Reservoir Management", 8th International Forum on Reservoir Simulation, Jun. 2005, Stressa, Italy.

Saleri, "The Next Trillion: Anticipating and Enabling Game-Changing Recoveries", JPT, Apr. 2006.

Saleri, "Haradh III: A Milestone for Smart Fields", JPT, Nov. 2006.

Saleri, "Dawn in the Desert: Saudi High Tech Paying Off at Ghawar", Energy Tribune, pp. 15-17, Sep. 2007.

(56) References Cited

OTHER PUBLICATIONS

Schlumberger.com retrieved from WayBack Machine, http://web.archive.org/web/20071230014516/http://www.slb.com/.
Slide from Presentation by Inventor Joe Ault (2003).
Smalley et al., "Reservoir Compartmentalization Assessed with Fluid Compositional Data", Society of Petroleum Engineers, Aug. 1994; SPE Reservoir Engineering, vol. 9 Is. 3; p. 175-180.
Society of Petroleum Engineers, "Guidelines for the Evaluation of Petroleum Reserves and Resources"; SPE in associate with World Petroleum Congresses and American Association of Petroleum Geologists, 2001; pp. 1-139.
Yin "Geomechanics-Reservoir Modeling by Displacement Discontinuity-Finite Element Method" University of Waterloo, 2008, p. 1-141.
U.S. Appl. No. 12/392,891, filed Feb. 25, 2009, Office Action dated Dec. 8, 2010.
U.S. Appl. No. 12/392,891, filed Feb. 25, 2009, Notice of Allowance dated Mar. 24, 2011.
U.S. Appl. No. 12/606,027, filed Oct. 26, 2009, Office Action dated Aug. 10, 2011.
U.S. Appl. No. 12/915,278, filed Oct. 29, 2010, Office Action dated Nov. 7, 2011.
U.S. Appl. No. 12/567,361, filed Sep. 25, 2009, Office Action dated Nov. 30, 2011.
U.S. Appl. No. 12/567,404, filed Sep. 29, 2009, Office Action dated Dec. 8, 2011.
U.S. Appl. No. 12/606,027, filed Oct. 26, 2009, Final Office Action dated Jan. 19, 2012.
U.S. Appl. No. 12/567,361, filed Sep. 25, 2009, Notice of Allowance dated Feb. 2, 2012.
U.S. Appl. No. 12/567,404, filed Sep. 25, 2009, Notice of Allowance dated Feb. 7, 2012.
U.S. Appl. No. 12/915,278, filed Oct. 29, 2010, Final Office Action dated Mar. 1, 2012.
U.S. Appl. No. 13/282,297, filed Oct. 26, 2011, Office Action dated Apr. 1, 2013.
U.S. Appl. No. 13/282,297, filed Oct. 26, 2011, Final Office Action dated Sep. 11, 2013.
U.S. Appl. No. 13/282,297, filed Oct. 26, 2011, Advisory Action dated Nov. 18, 2013.
U.S. Appl. No. 13/282,282, filed Oct. 26, 2011, Office Action dated Mar. 27, 2014.
U.S. Appl. No. 13/282,315, filed Oct. 26, 2011, Office Action dated Aug. 18, 2014.
U.S. Appl. No. 13/282,272, filed Oct. 26, 2011, Office Action dated Nov. 7, 2014.
U.S. Appl. No. 13/282,282, filed Oct. 26, 2011, Final Office Action dated Dec. 26, 2014.
U.S. Appl. No. 13/282,315, filed Oct. 26, 2011, Office Action dated Feb. 18, 2015.
U.S. Appl. No. 13/282,297, filed Oct. 26, 2011, Office Action dated Mar. 16, 2015.
U.S. Appl. No. 13/282,282, filed Oct. 26, 2011, Office Action dated May 11, 2015.
U.S. Appl. No. 13/282,315, filed Oct. 26, 2011, Final Office Action dated Jun. 25, 2015.
U.S. Appl. No. 13/282,282, filed Oct. 26, 2011, Office Action dated Nov. 20, 2015.
U.S. Appl. No. 13/282,282, filed Oct. 26, 2011, Notice of References cited dated Nov. 30, 15.
U.S. Appl. No. 13/282,272, filed Oct. 26, 2011, Final Office Action dated Dec. 9, 2015.
U.S. Appl. No. 13/282,297, filed Oct. 26, 2011, Final Office Action dated Dec. 30, 2015.
U.S. Appl. No. 13/282,315, filed Oct. 26, 2011, Office Action dated Mar. 9, 2016.
U.S. Appl. No. 13/282,272, filed Oct. 26, 2011, Office Action dated May 19, 2016.
U.S. Appl. No. 13/282,272, filed Oct. 26, 2011, Final Office Action dated Aug. 23, 2016.
U.S. Appl. No. 13/282,315, filed Oct. 26, 2011, Final Office Action dated Sep. 14, 2016.
U.S. Appl. No. 13/282,297, filed Oct. 26, 2011, Office Action dated Oct. 12, 2016.
U.S. Appl. No. 13/282,282, filed Oct. 26, 2011, Final Office Action dated Nov. 14, 2016.
U.S. Appl. No. 13/282,282, filed Oct. 26, 2011, Notice of Allowance dated Apr. 11, 2017.

* cited by examiner

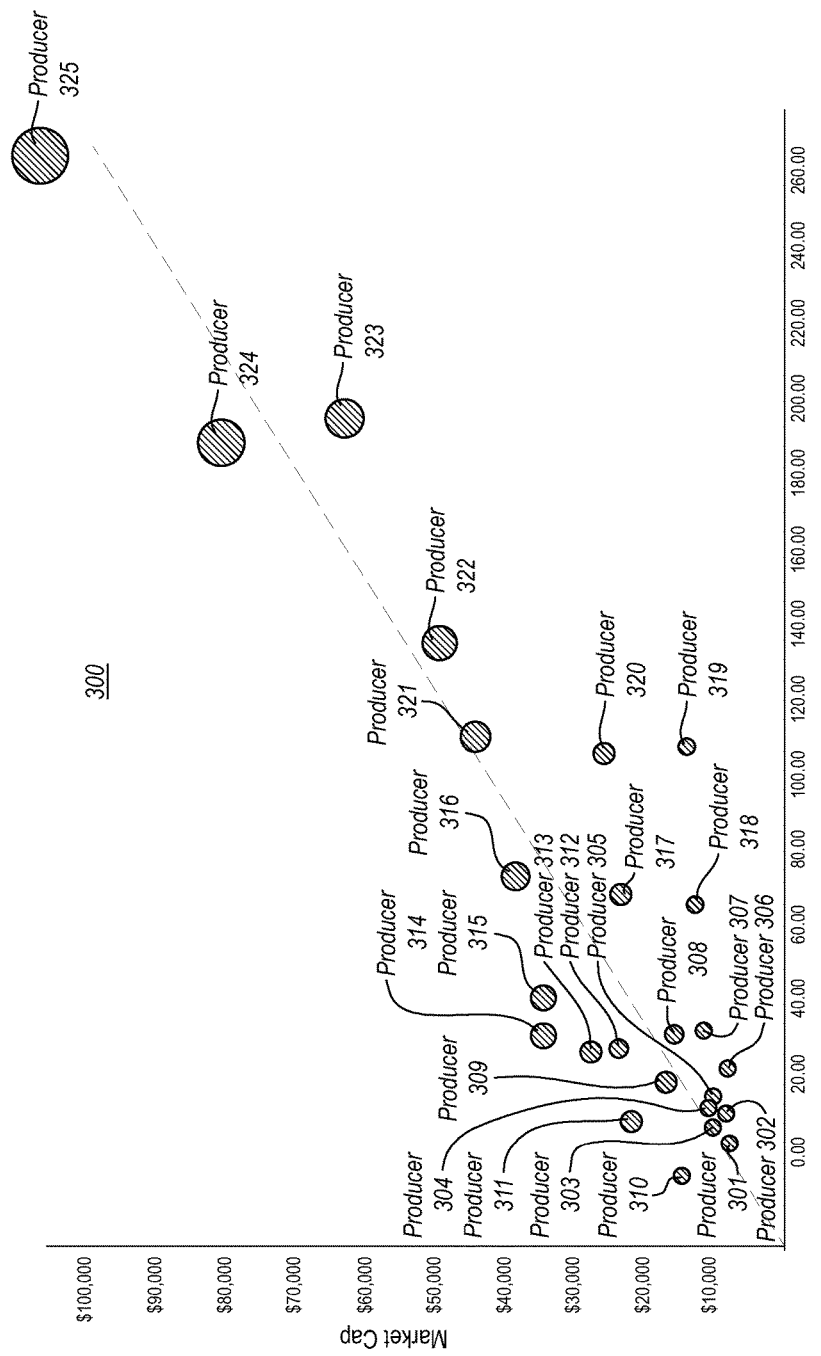

COMPUTERIZED METHOD AND SYSTEM FOR IMPROVING PETROLEUM PRODUCTION AND RECOVERY USING A RESERVOIR MANAGEMENT FACTOR

CROSS REFERENCE TO RELATED APPLICATIONS

This application is a continuation-in-part of U.S. patent application Ser. No. 13/282,315, filed Oct. 26, 2011, the disclosure of which is incorporated herein in its entirety.

BACKGROUND OF THE INVENTION

1. The Field of the Invention

The invention is in the field of petroleum reservoir operation and management, more particularly in the field of improving petroleum production by a producer using a reservoir management factor.

2. The Relevant Technology

Petroleum is a critical fuel source and is the life blood of modern society. There is tremendous economic opportunity in finding and extracting petroleum. Due to a variety of technical and geological obstacles, it is typically impossible to recover all of the petroleum contained in a reservoir. With advancing technologies and increasing economic incentive due to higher crude oil prices, the average petroleum reservoir recovery rate can now approach about 35%. While this represents a significant increase in average total petroleum recovery in recent years, it also means that about 65% of the petroleum found in a typical reservoir remains unrecoverable from an economic and/or technical standpoint.

Given the high cost of exploration, dwindling opportunities to find new petroleum reservoirs, and the rising cost of petroleum as a commodity, there currently exists a tremendous economic opportunity for organizations to significantly increase both short-term and long-term production across their petroleum reservoirs. When determining the feasibility of a new petroleum project, operators typically consider barrels of P1 (proved developed producing) reserves to be created by the project. However, it can be difficult to determine the true value (and thus the feasibility and potential profitability) of new petroleum projects. For example, with regard to planning, implementing and determining the feasibility of new petroleum projects, operators often fail to consider current production and other available reserves. These difficulties in turn make it difficult to determine technical and economic feasibility when undertaking a new petroleum project. Further, as technology changes, production rates and proven resources can also change. However, without consideration of these and other types of changes, determining the petroleum projects feasibility and value can be less accurate.

While the technology may, in fact, exist to increase current production and/or increase total long-term recovery of an organization's petroleum reservoirs, an impediment to implementing an intelligent long-term plan for maximizing current output, extending the life of each reservoir, and increasing total recovery across reservoirs is inadequate knowledge of how to focus a producer's limited resources for optimal production and recovery of petroleum. For example, while a particular reservoir may underperform relative to other reservoirs, which might lead some to neglect further development of the reservoir, the reservoir may, in fact, contain much larger quantities of recoverable petroleum but be under-producing simply due to poor technical management. Furthermore, organizations may waste resources developing some reservoirs in which production gains achieved are disproportionately small compared to the developmental resources expended. The inability to properly determine on which reservoirs to focus further development and resources and to implement an intelligent recovery plan can result in diminished short-term productivity and long-term recovery across the producer's petroleum reservoirs.

In general, those who operate production facilities typically focus on oil well maintenance at an individual reservoir level and may even implement the latest technologies for maximizing well output at the reservoir. They fail, however, to understand total health and longevity of the reservoir, including how the reservoir performs relative to other reservoirs, both on a short-term and long-term basis. These difficulties can lead to inaccurate assessment of the feasibility and valuation of proposed petroleum projects. For example, assessing a new project, such as drilling a new well without considering an operator's overall production and other available reserves can reduce the accuracy of assessing technical and economic feasibility with respect to the new project.

BRIEF SUMMARY OF THE INVENTION

The present invention relates to determining feasibility and value of petroleum projects and more particularly to methods, systems, and computer program products for determining and considering a premium related to petroleum reservoir reserve and production characteristics when determining feasibility and value of petroleum projects. The concept may euphemistically be called Reservoir Management Factor (RMF). RMF is systematic methodology for accurately determining a premium related to the feasibility and value of a petroleum project (e.g., drilling a new well and/or increasing productivity of an existing well).

Determining the Reservoir Management Factor (RMF) is a powerful method for quickly understanding a premium related to the feasibility and value of a petroleum project that takes into consideration an operator's existing petroleum production and petroleum capacity reserves. The types of petroleum projects that can be selected, designed, implemented and monitored using the disclosed methods include drilling additional wells, stimulating existing wells, and increasing reservoir contact of existing wells. The RMF enables a producer to efficiently and accurately determine both technical and economic feasibility of implementing certain types of capital projects and how to best design, implement and monitor such products from a technical standpoint.

In contrast to conventional methods in which only the present value of a petroleum production project is determined, the present invention considers both petroleum production over time and the increase in inventory (petroleum reserves) that result from implementation of the project. This permits a producer to determine the feasibility and value of, and more intelligently choose from among, different projects.

In general, the RMF for a petroleum producer is related to a coefficient of reserves and a coefficient of production for the petroleum producer. A RMF can be an absolute value derived from a multivariable correlation. In some embodiments, the RMF is calculated from the sum of an operator's coefficient of reserves plus the operator's coefficient of production, both of which require a detailed analysis of the physics and geology of the petroleum producer's reservoirs.

In general, the RMF or β for a petroleum producer can be defined by the following equation:

$$\beta = \text{Absolute Value [Coefficient of Reserves} + \text{Coefficient of Production]}$$

where,

Coefficient of Reserves and Coefficient of Production are derived from multivariable correlation to reflect a market value premium if the petroleum production was public, and β has dimensions of dollars per barrel (or other monetary unit).

The RMF can have dimensions of monetary value even though it is determined by determining physics and geology of one or more petroleum reservoirs. Expressing RMF in this manner aids a producer in comparing the feasibility of various projects, and designing and implementing specific capital projects, even though the design, implementation and monitoring of such projects involve substantial physical measures requiring sophisticated instrumentation, equipment and analysis. The RMF or β can be based on dollar or other monetary unit valuation of reserves and production numbers, which can be determined from direct measurements of the physics and geology of one or more reservoirs, supplemented with production and reserves data accessible from corporate documents (e.g., 10K filings). Through statistical analysis, a high correlation between production rate, reserves, and market capitalization has been determined to exist.

In some embodiments, the RMF can meet a threshold amount to justify a specific capital project from among various different capital projects. If the RMF is negative or below a specified minimum threshold, a likely determination is that no capital project is warranted. Above the specified minimum RMF threshold, some capital projects, such as well stimulation or other projects of relatively low complexity and capital requirement may be warranted, designed and implemented. Above a higher RMF threshold, other more complex and/or more capital intensive projects may be warranted, such as increasing well contact and/or more well intense stimulation. Above a still higher RMF threshold, still other more complex and/or more capital intensive projects may be warranted, such as drilling one or more new wells and/or more intense increases in well contact and/or stimulation and combination of the foregoing.

A more detailed description of how to determine a market value premium for a petroleum producer will be described hereafter. An RMF or β can also be used to determine the true value of a capital project. For example, in some embodiments an RMF or β is utilized in further calculations to determine a True Value Index (TVI) for a capital project. Additional details regarding the True Value Index (TVI) will also be described hereafter.

The Reservoir Management Factor (RMF) is an indicator or metric designed to quickly access technical and economic feasibility of undertaking a new capital project related to extracting petroleum from a petroleum reservoir. Embodiments of the invention provide management, engineers and investors with an effective new tool to identify opportunities to extract petroleum reserves with well-recognized benefits to involved parties. Notwithstanding its simplicity, indeed as a result of its simplified methodology, the present invention provides a revolutionary new tool that can accurately and efficiently assess technical and economic feasibility of a capital project which, in turn, permits interested parties to devise more effective and intelligent strategies for implementing technical upgrades to production facilities to increase the efficiency of petroleum extraction.

The Reservoir Management Factor (RMF) can advantageously be used as part of a more comprehensive reservoir evaluation system and methodology known as Reservoir Competency Asymmetric Assessment (or RCAA), which is discussed more fully below in the Detailed Description.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof, which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 3A is a scatter plot that illustrates a technical and statistical correlation between market capitalization and production;

DETAILED DESCRIPTION OF THE PREFERRED EMBODIMENTS

I. Introduction

Figure 1:
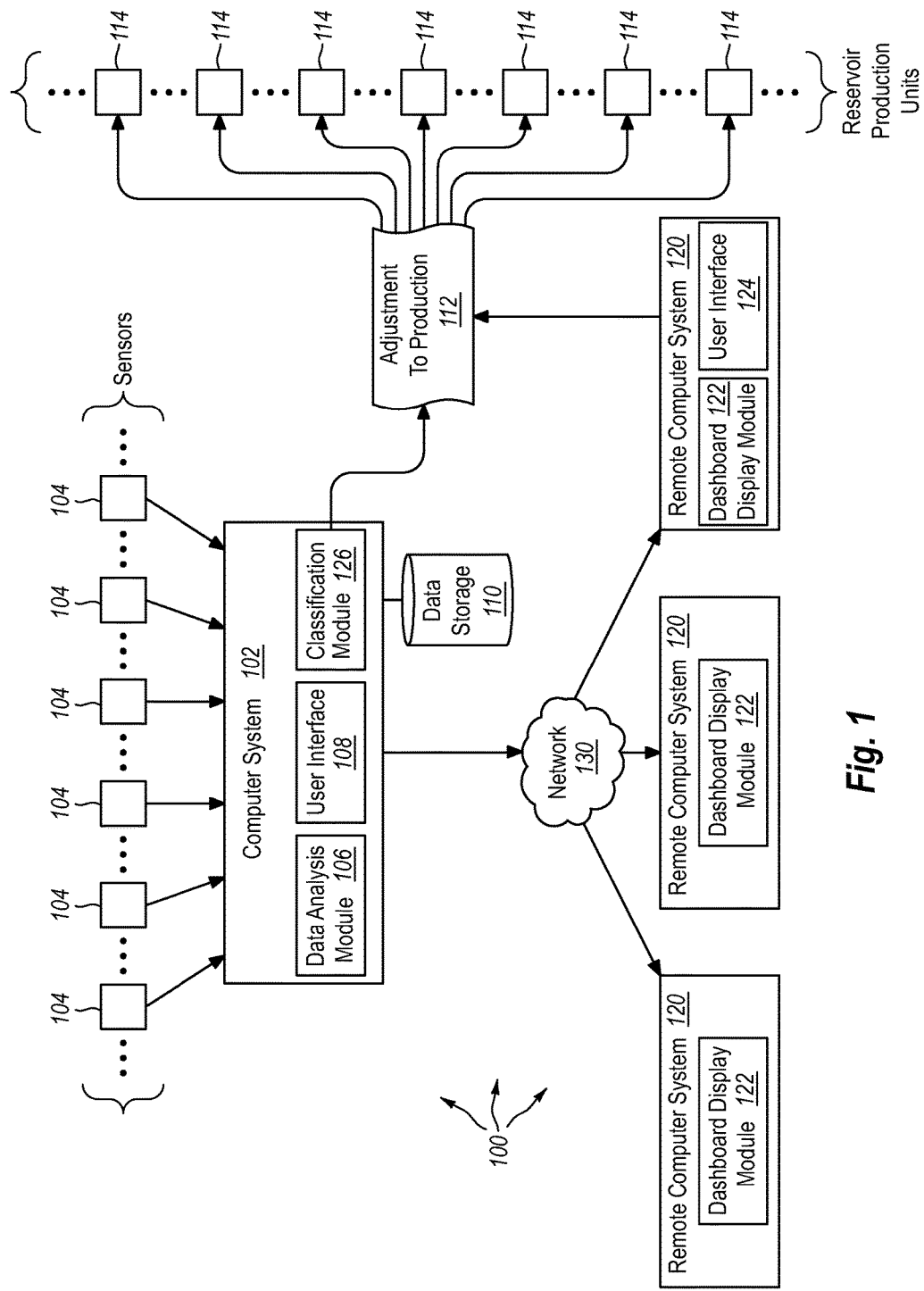
FIG. 1 schematically illustrates exemplary computer-implemented or controlled architecture that can be used to gather, analyze and/or display data gathered from and about a petroleum reservoir.

Embodiments of the invention relate to the determination of a Reservoir Management Factor (RMF) for a petroleum producer used when designing and implementing capital projects related to extraction of petroleum from a reservoir. The Reservoir Management Factor (RMF) is a novel indicator and metric that is designed to quickly and accurately assess the technical and economic feasibility of undertaking a petroleum related project, such as, for example, drilling one or more additional wells, stimulating one or more existing wells, and/or increasing reservoir contact of one or more existing wells. Embodiments of the invention provide management, engineers and investors with an effective tool to identify opportunities to increase production of a petroleum reservoir with well-recognized benefits to involved parties.

The Reservoir Management Factor (RMF) can be used in conjunction with, and as an important component of, a larger, more comprehensive system for assessing petroleum reservoir competency. An example of a larger, more comprehensive system developed by the inventors is known as Reservoir Competency Asymmetric Assessment (or RCAA), a description of which is set forth in U.S. Pat. No. 7,963,327, issued Jun. 21, 2011, and entitled "METHOD FOR DYNAMICALLY ASSESSING PETROLEUM RESERVOIR COMPETENCY AND INCREASING PRODUCTION AND RECOVERY THROUGH ASYMMETRIC ANALYSIS OF PERFORMANCE METRICS," which is incorporated herein in its entirety by reference.

By way of background, RCAA includes several closely interrelated sub-methods or modules that are employed in concert and sequentially. These methods or modules can be used in forming metrics and indicators regarding petroleum reserves that are used as part of the RMF, and knowledge gained as part of a RMF can be further applied to an iterative application of RCAA to petroleum reserves. The methods or modules are (i) analyzing and diagnosing the specific and unique features of a reservoir (i.e., its physical and geological "DNA") using targeted metrics, of which the Reservoir Management Factor (RMF) can be added or modified so as to function as one of the components, (ii) designing a recovery plan for maximizing or increasing current production and ultimate recovery (e.g., increasing recoverable petroleum reserves) from the petroleum reservoir, (iii) implementing the recovery plan so as to increase current production and ultimate recovery of petroleum from the reservoir, and (iv) monitoring or tracking the performance of the petroleum reservoir using targeted metrics and making adjustments to production parameters, as necessary, to maintain desired productivity and recovery.

RCAA and RMF each rely on intense technical knowledge gathering techniques, which can include taking direct measurements of the physics, geology, and other unique conditions and aspects of the reservoir and, where applicable, considering the type, number, location and efficacy of any wells that are servicing, or otherwise associated with, the reservoir (e.g., producing wells, dead wells, and observation wells), analyzing the present condition or state of the reservoir using asymmetric weighting of different metrics, and prognosticating future production, recovery and other variables based on a comprehensive understanding of the specific reservoir DNA coupled with the asymmetric weighting and analysis of the data. In some cases, the technical information can based on measurements and data generated by the reservoir manager.

In general, RCAA is an assessment process which guides both the planning and implementation phases of petroleum recovery. All hydrocarbon assets carry an individual "DNA" reflective of their technical and geological subsurface and surface features. RCAA is an enabling tool for developing and applying extraction methods that are optimally designed to the specifications of individual hydrocarbon reservoirs. Its main value is assisting in the realization of incremental barrels of reserves and production over and above levels being achieved using standard industry techniques. This, in turn, may reduce long-term capital and operating expenses.

According to one embodiment, implementation of RCAA spans six interweaving and interdependent tracks: i) Knowledge Systems; ii) Q6 Surveys; iii) Deep Insight Workshops; iv) Q-Diagnostics; v) Gap Analysis; and vi) Plan of Action. The information gathered from these tracks is integrated using modern knowledge-sharing mediums including web-based systems and communities of practice. While the overall business model of RCAA™ includes both technological and non-technological means for gathering the relevant information, the method cannot be implemented without the use of physical processes and machinery for measuring and gathering technical information relating to the physics and geology of the petroleum reservoir. Moreover, implementing a plan of action involves computerized monitoring of well activity. Enhanced reservoir performance, including increase production and recovery, requires and results in physical transformations of one or more petroleum reservoirs.

Determining a Reservoir Management Factor (RMF) similarly involves physical processes and machinery for measuring and gathering technical information relating to the physics and geology of the petroleum reservoir. Converting such information, which relates to both the geological characteristics of the reservoir as well as operational attributes of the petroleum recovery plan, into a Reservoir Management Factor (RMF) is a transformation of essentially physical data into a diagnostic determination that direct assists in implementing a capital project to increase production and recovery from petroleum reservoirs. To the extent that such transformations of data are carried out and displayed using a computer system programmed to determine a Reservoir Management Factor (RMF) from the underlying data, more particularly using a processor and system memory, such a computer system is itself a machine (i.e., a special purpose computer).

Because the subsurface plumbing of the reservoir is not homogeneous, it will often be necessary to statistically weight some data points more than others in order to determine a more accurate assessment of the reservoir "DNA". In some cases, outlier data points may simply be anomalies and can be ignored or minimized. In other cases, outliers that show increased recovery efficiency for one or more specific regions of the reservoir may themselves be the ideal and indicate that extraction techniques used in other, less productive regions of the reservoir may need improvement.

Physical processes that utilize machinery to gather data include, for example, 1) coring to obtain down-hole rock samples (both conventional and special coring), 2) taking down-hole fluid samples of oil, water and gas, 3) measuring initial pressures from radio frequency telemetry or like devices, and 4) determining fluid saturations from well logs (both cased hole and open hole). Moreover, once a plan of action is implemented and production and/or recovery from the reservoir are increased, the reservoir is physically transformed from a lower-producing to a higher-producing asset.

Monitoring the performance of the reservoir before, during and/or after implementation of a plan of action based on the RMF involves the use of a computerized system (i.e., part of a "control room") that receives, analyzes and displays relevant data (e.g., to and/or between one or more computers networked together and/or interconnected by the internet). Examples of metrics that can be monitored include 1) reservoir pressure and fluid saturations and changes with logging devices, 2) well productivity and drawdown with logging devices, fluid profile in production and injection wells with logging devices, and oil, gas and water production and injection rates. Relevant metrics can be transmitted and displayed to recipients using the internet or other network. Web based systems can share such data.

FIG. 1 illustrates an exemplary computer-implemented monitoring and analysis system 100 that monitors reservoir performance, analyzes information regarding reservoir performance, displays dashboard metrics, and optionally provides for computer-controlled modifications to maintain optimal oil well performance. Monitoring and analysis system 100 includes a main data gathering computer system 102 comprised of one or more computers located near a reservoir and linked to reservoir sensors 104. Each computer typically includes at least one processor and system memory. Computer system 102 may comprise a plurality of networked computers (e.g., each of which is designed to analyze a sub-set of the overall data generated by and received from the sensors 104). Reservoir sensors 104 are typically positioned at producing oil well, and may include both surface and sub-surface sensors. Sensors 104 may also be positioned at water injection wells, observation wells, etc. The data measured and gathered by sensors 104 can be used to generate performance metrics (e.g., leading and lagging indicators of production and recovery), including those which relate to the determination of the Reservoir Management Factor (RMF). The computer system 102 may therefore include a data analysis module 106 programmed to establish reservoir metrics from the received sensor data. A user interface 108 provides interactivity with a user, including the ability to input data relating to a real displacement efficiency, vertical displacement efficiency, and pore displacement efficiency. Data storage device or system 110 can be used for long-term storage of data and metrics generated from the data, including data and metrics relating to the Reservoir Management Factor (RMF).

According to one embodiment, computer system 102 can provide for at least one of manual or automatic adjustment to production 112 by reservoir production units 114 (e.g., producing oil wells, water injection wells, gas injection wells, heat injectors, and the like, and sub-components thereof). Adjustments might include, for example, changes in volume, pressure, temperature, and/or well bore path (e.g., via closing or opening of well bore branches). The user interface 108 permits manual adjustments to production 112. The computer system 102 may, in addition, include alarm levels or triggers that, when certain conditions are met, provide for automatic adjustments to production 112.

Monitoring system 100 may also include one or more remote computers 120 that permit a user, team of users, or multiple parties to access information generated by main computer system 102. For example, each remote computer 120 may include a dashboard display module 122 that renders and displays dashboards, metrics, or other information relating to reservoir production. Each remote computer 120 may also include a user interface 124 that permits a user to make adjustment(s) to production 112 by reservoir production units 114. Each remote computer 120 may also include a data storage device (not shown).

Individual computer systems within monitoring and analysis system 100 (e.g., main computer system 102 and remote computers 120) can be connected to a network 130, such as, for example, a local area network ("LAN"), a wide area network ("WAN"), or even the Internet. The various components can receive and send data to each other, as well as other components connected to the network. Networked computer systems and computers themselves constitute a "computer system" for purposes of this disclosure.

Networks facilitating communication between computer systems and other electronic devices can utilize any of a wide range of (potentially interoperating) protocols including, but not limited to, the IEEE 802 suite of wireless protocols, Radio Frequency Identification ("RFID") protocols, ultrasound protocols, infrared protocols, cellular protocols, one-way and two-way wireless paging protocols, Global Positioning System ("GPS") protocols, wired and wireless broadband protocols, ultra-wideband "mesh" protocols, etc. Accordingly, computer systems and other devices can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), Simple Object Access Protocol ("SOAP"), etc.) over the network.

Computer systems and electronic devices may be configured to utilize protocols that are appropriate based on corresponding computer system and electronic device on functionality. Components within the architecture can be configured to convert between various protocols to facilitate compatible communication. Computer systems and electronic devices may be configured with multiple protocols and use different protocols to implement different functionality. For example, a sensor 104 at an oil well might transmit data via wire connection, infrared or other wireless protocol to a receiver (not shown) interfaced with a computer, which can then forward the data via fast Ethernet to main computer system 102 for processing. Similarly, the reservoir production units 114 can be connected to main computer system 102 and/or remote computers 120 by wire connection or wireless protocol.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Non-transient computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code.

II. Determining Reservoir Management Factor (RMF) for a Petroleum Producer

Figure 2:
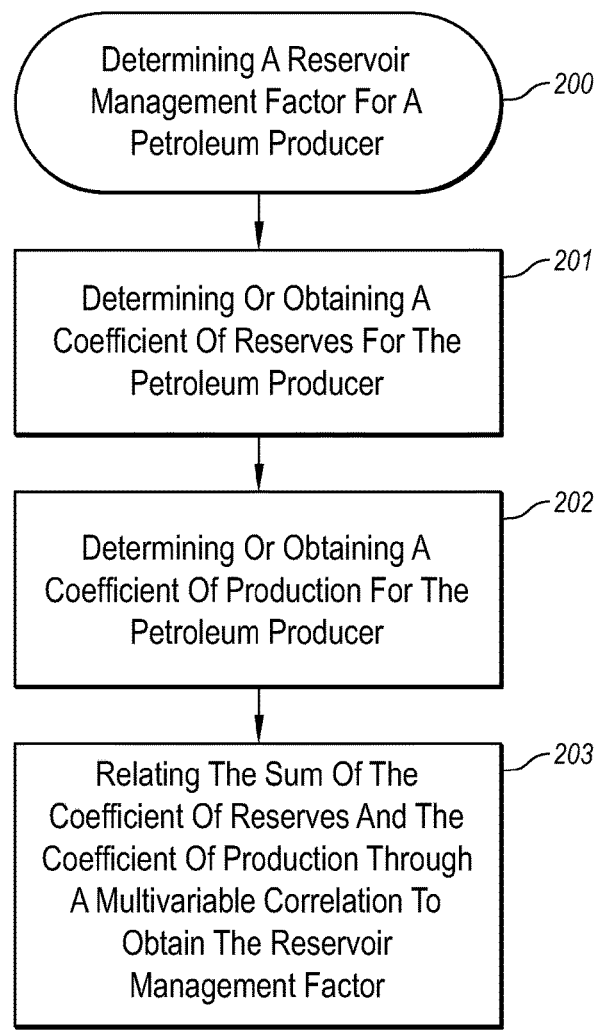
FIG. 2 is a flow diagram that illustrates exemplary acts for determining a Reservoir Management Factor (RMF) for a petroleum producer.

In general, a Reservoir Management Factor (RMF or $\beta$) is a statistically driven determination with a high correlation to a petroleum producer's market capitalization that also captures the effect on market value for a capital project. The Reservoir Management Factor (RMF or $\beta$) represents a factor for calculating a premium to the value of any capital petroleum projects undertaken by the petroleum producer. FIG. 2 is a flow diagram that illustrates exemplary acts in a process 200 for determining a Reservoir Management Factor (RMF) for a petroleum producer. Process or sequence 200 includes an act or step 201 of determining or obtaining a coefficient of reserves for the petroleum producer. The process or sequence 200 further includes an act or step 202 of determining or obtaining a coefficient of production for the petroleum producer. The process or sequence 200 further includes an act or step 203 of relating the sum of the coefficient of reserves and the coefficient of production through a multivariable correlation to obtain a Reservoir Management Factor (RMF or $\beta$) for the petroleum producer such as, for example, according to the following equation:

$$\beta = \text{sum of regression coefficients} = \text{sum of (reserves coefficient, production coefficient)}$$

wherein,
reserves coefficient=the coefficient of the petroleum producer's reserves; and
production coefficient=the coefficient of the petroleum producer's production.

Reserves coefficient and production coefficient can determined by using statistical methods on present and/or historical technological data for petroleum producers. In general, there exists a relatively high correlation (e.g., >0.70) between reserves, production, and market capitalization. Reserves and production numbers can be determined from measurement data taken in accordance with sensors 104. Alternatively, at least some technologically-based reserves and production data can be obtained from corporate filings, such as, for example, 10K filings.

FIG. 3A is a scatter plot 300 that illustrates a correlation between market capitalization and production. In general, there is a relatively strong relationship (e.g., >0.70 correlation) between market capitalization and production at any given point in time. For example, scatter plot 300 depicts a 0.773 correlation between market capitalization and production based on a 10-year observation for petroleum producers 301-325.

Figure 3B:
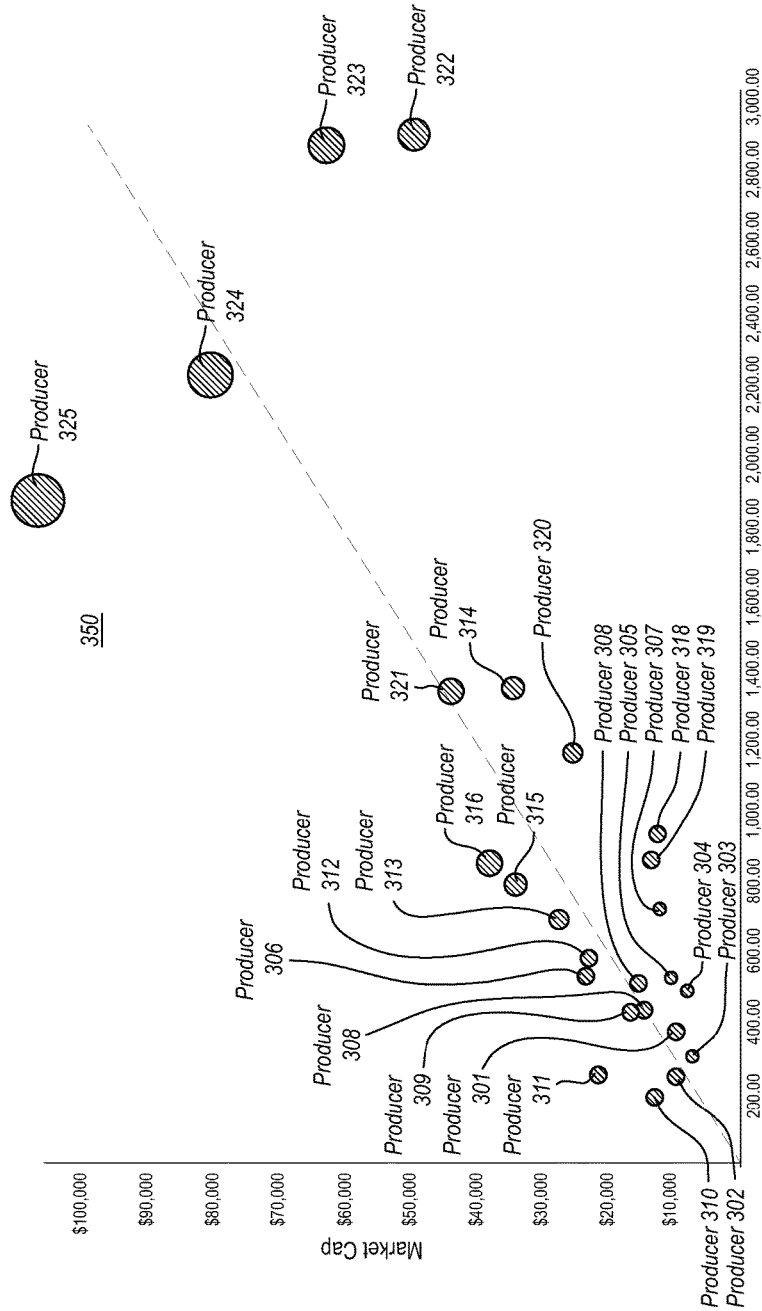
FIG. 3B is a scatter plot that illustrates a technical and statistical correlation between market capitalization and reserves.

FIG. 3B is a scatter plot 350 that illustrates a correlation between market capitalization and reserves. In general, there is a relatively strong relationship (e.g., >0.70 correlation) between market capitalization and reserves at any given point in time. For example, scatter plot 350 depicts a 0.90 correlation between market capitalization and reserves based on a 10-year observation for petroleum producers 301-325.

Figure 4:
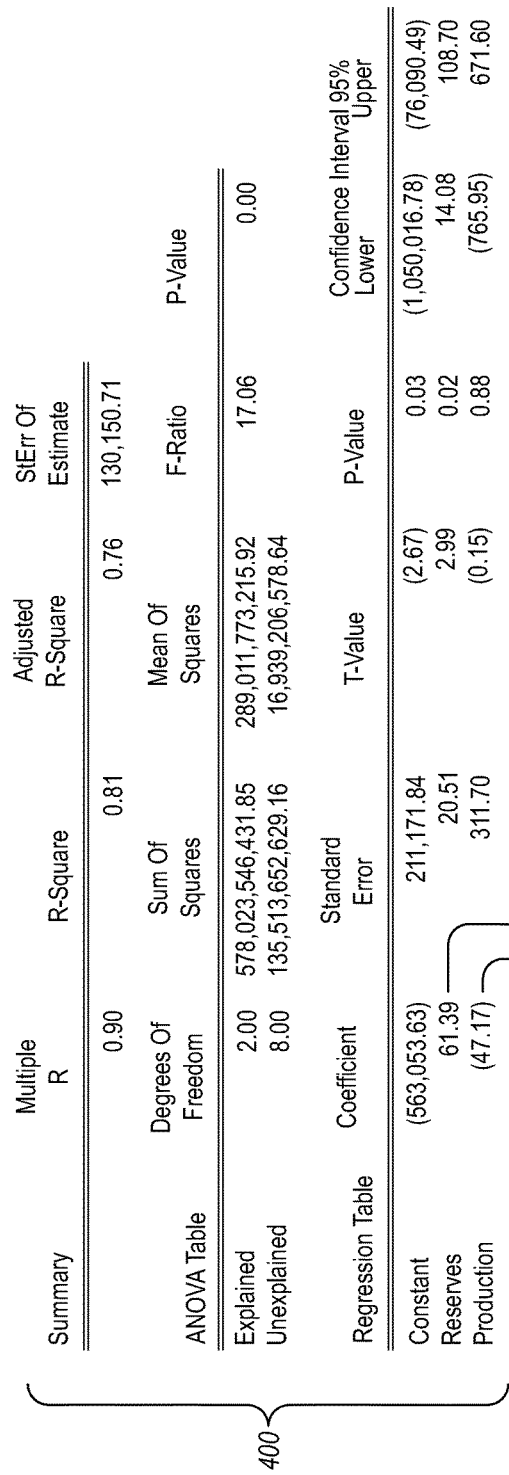
FIG. 4 is a chart illustrating regression coefficients for reserves and production.

FIG. 4 is a chart 400 illustrating regression coefficients for reserves and production. As depicted, reserves coefficient 401 has a value of $61.30/bbl and production coefficient 402 has a value ($47.17/bbl). Based these values, a Reservoir Management Factor (RMF or $\beta$) for a petroleum producer can be determined as follows:

$$\beta = \text{Sum } [\$61.39/\text{bbl}, -\$47.17/\text{bbl}] = \$14.22/\text{bbl}$$

For this example, the Reservoir Management Factor (RMF or $\beta$) for the producer represents a premium of $14.22/bbl for new reserves to be created by any projects for the petroleum producer. A Reservoir Management Factor (RMF or $\beta$) can be used to determine the true value of a petroleum project. For example, in some embodiments an RMF or $\beta$ is utilized in further calculations to determine a True Value Index (TVI) for a capital project.

In some embodiments, the RMF can meet a threshold amount to justify a specific capital project from among various different capital projects. If the RMF is negative or below a specified minimum threshold (e.g., $5/bbl for new reserves to be created), one possible determination is that no capital project is warranted. Above the specified minimum RMF threshold (e.g., $5/bbl for new reserves to be created), some capital projects, such as well stimulation or other projects of relatively low complexity and capital requirement may be warranted, designed and implemented. Above a higher RMF threshold (e.g., $10/bbl for new reserves to be created), other more complex and/or more capital intensive projects may be warranted, such as increasing well contact and/or more well intense stimulation. Above a still higher RMF threshold (e.g., $15/bbl for new reserves to be created), still other more complex and/or more capital intensive projects may be warranted, such as drilling one or more new wells and/or more intense increases in well contact and/or stimulation and combination of the foregoing. The different threshold RMF values can be any monetary or other appropriate denomination or feasibility measurement having defined units. When the different threshold RMF values are based on monetary values, they can be any value of at least $2/bbl for new reserves to be created, including any integer value greater than $2/bbl for new reserves to be created, and fractional monetary valuations therebetween, including hundredth of dollar (i.e., cent) increments or amounts.

By way of example, the capital cost of a new design and build project can have a return on investment at least as high as the threshold RMF to be considered to be both technically and economically feasible, taking into consideration the cost of operating and maintaining the project, marginal cost of operating the project, the current price of oil, and the like.

Figure 5:
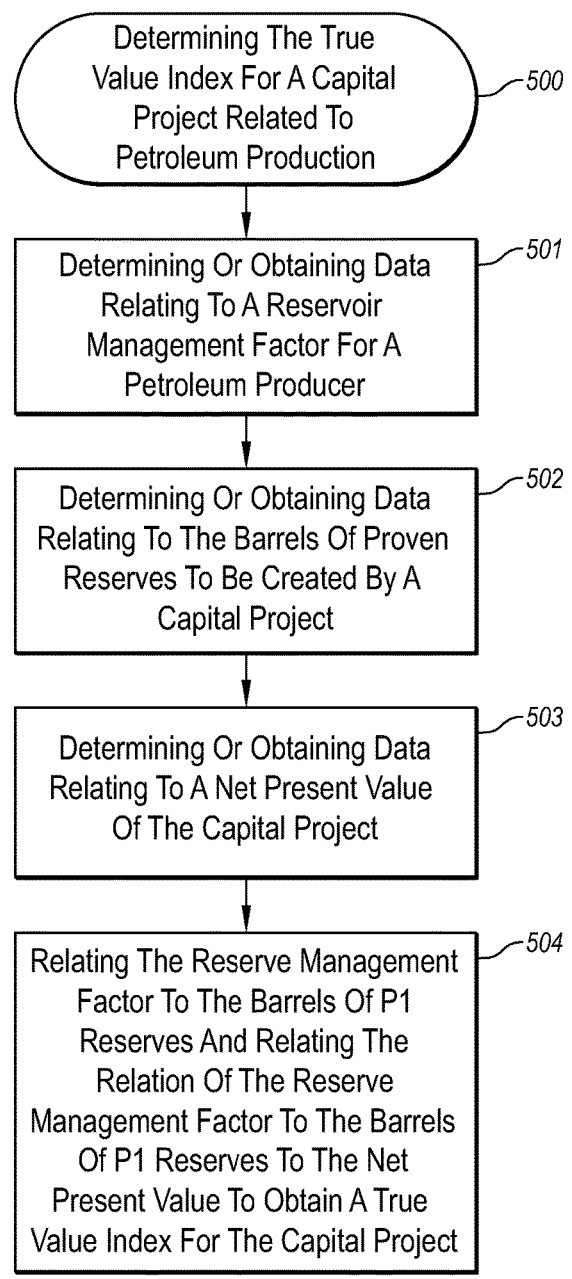
FIG. 5 is a flow diagram that illustrates exemplary acts for determining a True Value Index (TVI) for a capital project related to petroleum production.

FIG. 5 is a flow diagram that illustrates exemplary acts of a process 500 for determining a True Value Index (TVI) for a capital project related to petroleum production, such as, for example, drilling additional wells, stimulating existing wells, and/or increasing reservoir contact of existing wells. Process or sequence 500 includes an act or step 501 of determining or obtaining data relating to a Reservoir Management Factor (RMF) for a petroleum producer ($\beta$). The process or sequence 500 further includes an act or step 502 of determining data relating to the barrels of proven reserves to be created by a capital project (Reserves). The process or sequence 500 further includes an act or step 503 of determining or obtaining data relating to a net present value of the capital project (NPV). The process or sequence 500 further includes an act or step 504 of relating the reserve management factor to the barrels of proven reserves and relating the relation of the reserve management factor to the barrels of proven reserves to the net present value, to obtain the True Value Index (TVI) for the capital project, such as, for example, according to the following equation:

TVI=NPV+(β*Reserves)

where,

NPV=Net present value of a project;

β=Reservoir Management Factor (RMF)=absolute value (sum of Coefficient of Reserves and Coefficient of Production) derived from multivariable correlation (i.e., to reflect the market value premium on increased reserves if the producer was public); and Reserves=Barrels of proven reserves to be created by the project.

Petroleum reserves can be classified in a variety of different ways. Reserves can refer to quantities of petroleum claimed to be commercially recoverable by application of development projects to known accumulations under defined conditions. Various criteria are to be satisfied for petroleum to be classified as reserves, such as, for example, discovered through one or more exploratory wells, recoverable using existing technology, commercially viable, and remaining in the ground.

Reserves estimates can have inherent uncertainty, for example, depending on the amount of reliable geological and engineering data available and the interpretation of those data. The relative degree of uncertainty can be expressed by dividing reserves into two principal classifications-"proven" (or "proved") and "unproven" (or "unproved"). Unproven reserves can further be divided into two subcategories—"probable" and "possible"—to indicate the relative degree of uncertainty about their existence. Commonly accepted definitions of these can be based on those approved by the Society of Petroleum Engineers (SPE) and the World Petroleum Council (WPC) in 1997.

Proven reserves are those reserves claimed to have a reasonable certainty (e.g., normally with at least 90% confidence) of being recoverable under existing economic and political conditions, with existing technology. Industry specialists refer to this as P90 (i.e., having a 90% certainty of being produced). Proven reserves are also known in the industry as 1P (or P1). Proven reserves can also be further subdivided into "proven developed" (PD) and "proven undeveloped" (PUD). PD reserves are reserves that can be produced with existing wells and perforations, or from additional reservoirs where minimal additional investment (operating expense) is required. PUD reserves require significant additional capital investment (e.g., drilling new wells) to bring the oil to the surface.

Unproven reserves are based on geological and/or engineering data similar to that used in estimates of proven reserves, but technical, contractual, or regulatory uncertainties preclude such reserves being classified as proven. They are sub-classified as probable and possible. Probable reserves are attributed to known accumulations and claim a 50% confidence level of recovery. Industry specialists refer to them as P50 (i.e., having a 50% certainty of being produced). These reserves are also referred to in the industry as 2P (P2) (proven plus probable).

Possible reserves are attributed to known accumulations that have a lower chance of being recovered than probable reserves. This term is often used for reserves which are claimed to have at least a 10% certainty of being produced (P10). Reasons for classifying reserves as possible include varying interpretations of geology, reserves not producible at commercial rates, uncertainty due to reserve infill (seepage from adjacent areas), and projected reserves based on future recovery methods. They are referred to in the industry as 3P (or P3) (proven plus probable plus possible).

For example, the petroleum producer may be considering a project to create 740,000 barrels of reserves. The Net Present Value ("NPV") of the project may be $40 million. The True Value Index (TVI) for the project can be calculated as follows:

TVI=$40MM+($14.22/bbl*740,000 barrels)

=$40MM+($10.52MM)

=50.52MM.

In short, the present invention provides a simple, yet powerful, diagnostic tool that can be used to quickly and accurately assess the Reservoir Management Factor (RMF) for a petroleum producer. The Reservoir Management Factor (RMF) accounts for the impact of petroleum producer's reserves and production on determining the feasibility and value of different capital projects for increasing petroleum production and recovery. The inventiveness of the disclosed methods lies in their simplicity and ease of implementation. Although sophisticated managers and operators of petroleum reservoirs have been assessing capital projects for decades, and there has existed a long-felt need for finding improved and more streamlined methods for assessing opportunities for economically increasing petroleum production, those of skill in the art have overlooked and failed to appreciate the powerful diagnostic power and quick implementation of the methods disclosed herein, which satisfy a long-felt need known in the art but heretofore unsatisfied. Moreover, the accuracy by which one may quickly determine a Reservoir Management Factor (RMF) for a petroleum producer is, compared to conventional practices, unpredictable and an unexpected result.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for modifying operation of production units at a petroleum reservoir to increase petroleum production/recovery efficiency of the petroleum reservoirs, the method comprising:

measuring, using one or more sensors placed in the petroleum reservoir, physical or geological characteristics of the petroleum reservoir relating to at least one of reservoir pressure, fluid saturations, well productivity and drawdown, fluid profile, oil production, gas production, water production, injection rate, real displacement efficiency, vertical displacement efficiency, and pore displacement efficiency;

calculating, using one or more processors, a coefficient of reserves based on measurements of the physical or geological characteristics of the petroleum reservoir obtained by the one or more sensors placed in the petroleum reservoir, wherein the coefficient of reserves is measured in units of monetary amount divided by quantity of petroleum and corresponds to a value of current reserves associated with the petroleum reservoir;

receiving present or historical production data for one or more producing oil wells associated with the petroleum reservoir, calculating, using one or more processors, a coefficient of production based on the present or historical production data, wherein the coefficient of production is measured in units of monetary amount divided by quantity of petroleum and corresponds to a current production value of the petroleum reservoir;

calculating, using one or more processors, a reservoir management factor ($\beta$) for the petroleum reservoirs based on the coefficient of reserves and the coefficient of production, wherein the reservoir management factor ($\beta$) is measured in units of monetary amount divided by quantity of petroleum and corresponds to a market value premium associated with increasing the petroleum production/recovery efficiency of the petroleum reservoir per unit quantity of petroleum;

based on the reservoir management factor ($\beta$), using one or more processors to execute computer executable instructions for selecting and designing a modification of production units at the petroleum reservoirs to increase the petroleum production/recovery efficiency of the petroleum reservoir, wherein if the reservoir management factor ($\beta$) is above a minimum threshold and below an intermediate threshold, the modification comprises stimulating one or more existing wells;

wherein if the reservoir management factor ($\beta$) is above the intermediate threshold and below an upper threshold, the modification comprises one or more of stimulating one or more existing wells or increasing reservoir contact of one or more existing wells; and wherein if the reservoir management factor ($\beta$) is above the upper threshold, the modification comprises one or more of stimulating one or more existing wells, increasing reservoir contact of one or more existing wells, or drilling one or more new wells; and implementing the modification of production units at the petroleum reservoir to increase petroleum production/recovery efficiency of the petroleum reservoir, wherein the production units are selected from one or more of producing oil wells, water injection wells, gas injection wells, heat injectors, or sub-components thereof.

2. The method of claim 1, wherein determining the reservoir management factor ($\beta$) comprises determining an absolute sum of the coefficient of reserves; and the coefficient of production.

3. The method of claim 1, wherein calculation the coefficient of reserves is additionally based on statistical algorithms and historically observed petroleum production data for a sample set of petroleum producers.

4. The method of claim 1, wherein calculating the reservoir management factor ($\beta$) further comprises relating a sum of the coefficient of reserves and the coefficient of production through a multivariable correlation.

5. The method of claim 1, wherein if the reservoir management factor ($\beta$) is below the minimum threshold, the modification comprises changing one or more of a volume, a pressure, a temperature, or a well bore path of at least one production unit at the petroleum reservoir.

6. The method of claim 1, wherein the minimum threshold comprises at least $2/bbl or a unit equivalent thereof.

7. The method of claim 1, wherein the minimum threshold comprises at least $5/bbl or a unit equivalent thereof, the intermediate threshold comprises at least $7/bbl or the unit equivalent thereof, and the upper threshold comprises at least $9/bbl the a unit equivalent thereof.

8. The method of claim 7, wherein the intermediate threshold comprises at least $10/bbl or the unit equivalent thereof, and the upper threshold comprises at least $12/bbl or a unit equivalent thereof.

9. The method of claim 8, wherein the upper threshold comprises at least $15/bbl or the unit equivalent thereof.

10. In a computing system having a processor and system memory, a method for modifying operation of production units used in producing petroleum from petroleum reservoirs of a petroleum producer in order to increase petroleum production/recovery efficiency of the petroleum reservoirs, the method comprising:

receiving measurement data obtained by one or more sensors placed in the petroleum reservoirs, the measurement data relating to physical and geological characteristics of the petroleum reservoir relating to at least one of reservoir pressure, fluid saturations, well productivity and drawdown, fluid profile, oil production, gas production, water production, injection rate, real displacement efficiency, vertical displacement efficiency, and pore displacement efficiency;

receiving, at the computing system, a type, number, location, and efficiency of wells servicing the petroleum reservoirs;

calculating, using the processor, a coefficient of reserves based on the measurement data obtained by the one or more sensors placed in the petroleum reservoirs, the coefficient of reserves being measured in units of monetary amount divided by quantity of petroleum;

calculating, using the processor, a coefficient of production based on the type, number, location, and efficiency of wells servicing the petroleum reservoirs, the coefficient of reserves being measured in units of monetary amount divided by quantity of petroleum;

calculating, using the processor, a reservoir management factor ($\beta$) for the petroleum reservoirs based on the coefficient of reserves and the coefficient of production, wherein the reservoir management factor ($\beta$) is measured in units of monetary amount divided by quantity of petroleum;

based on the reservoir management factor ($\beta$), selecting and designing a modification of production units for the petroleum reservoirs, at the computing system, to increase petroleum production/recovery efficiency of petroleum reservoirs of the petroleum producer; and implementing, using the computing system, the modification of production units, including manually or automatically modifying operation of one or more production units selected from producing oil wells, water injection wells, gas injection wells, heat injectors, or sub-components thereof, wherein adjusting the operation of the one or more production units is selected from change in volume, change in pressure, change in temperature, change in well bore path, drilling one or more new wells, stimulating one or more existing wells, and/or increasing reservoir contact of one or more existing wells.

11. The method of claim 10, further comprising:

receiving data at the computing system relating to production of petroleum by the producer included in a 10K filing; and the computing system calculating the coefficient of reserves and the coefficient of production based in part from the data included in a 10K filing.

12. The method of claim 10, wherein calculating one or both of the coefficient of production or the coefficient of reserves comprises using statistical algorithms and historically observed petroleum production data for a sample set of petroleum producers.

13. The method of claim 10, the computing system determining the reservoir management factor (β) according to the following equation:

$$\beta = \text{the coefficient of reserves minus the coefficient of production.}$$

14. The method of claim 10, wherein the petroleum producer is a publicly traded corporation and wherein the reservoir management factor (β) reflects a market premium on increased reserves.

15. The method of claim 10, further comprising:
receiving, at the computing system, data relating to barrels of proven reserves (Reserves) to be created by the modification;
receiving, at the computing system, data relating to a net present value (NPV) of the modification; and
the computing system determining, by relating the reservoir management factor (β) to the barrels of proven reserves (Reserves) and the net present value (NPV), a true value index (TVI) for the modification.

16. The method of claim 15, wherein the true value index (TVI) is determined according to the following:

$$TVI = NPV + (\beta * Reserves).$$

17. The method of claim 10, further comprising using the reservoir management factor (β) as part of a method for determining an economic feasibility of the modification.

18. The method of claim 10, further comprising monitoring the modified production units using sensors at the modified production units.

19. The method of claim 18, wherein monitoring the modified production includes a remote computing system displaying a dashboard with data relating to the monitored production units.

20. A method for modifying operation of production units at a petroleum reservoir to increase petroleum production/recovery efficiency of the petroleum reservoir, the method comprising:
receiving, at a computing system comprising one or more processors, measurement data corresponding to measurements taken by one or more sensors placed in the petroleum reservoir, the measurement data corresponding to physical or geological characteristics of the petroleum reservoir and relating to at least one of reservoir pressure, fluid saturations, well productivity and drawdown, fluid profile, oil production, gas production, water production, injection rate, real displacement efficiency, vertical displacement efficiency, and pore displacement efficiency;
calculating, using the one or more processors, a coefficient of reserves based on measurements of the physical or geological characteristics of the petroleum reservoir obtained by the one or more sensors placed in the petroleum reservoir, wherein the coefficient of reserves is measured in units of monetary amount divided by quantity of petroleum and corresponds to a value of current reserves associated with the petroleum reservoir;
receiving, at the computing system, present or historical production data for one or more producing oil wells associated with the petroleum reservoir;
calculating, using the one or more processors, a coefficient of production based on the present or historical production data, wherein the coefficient of production is measured in units of monetary amount divided by quantity of petroleum and corresponds to a current production value of the petroleum reservoir;
calculating, using the one or more processors, a reservoir management factor (β) for the petroleum reservoir based on the coefficient of reserves and the coefficient of production, wherein the reservoir management factor (β) is measured in units of monetary amount divided by quantity of petroleum and corresponds to a market value premium associated with increasing the petroleum production/recovery efficiency of the petroleum reservoir per unit quantity of petroleum;
based on the reservoir management factor (β), determining a modification of production units at the petroleum reservoir that increases the petroleum production/recovery efficiency of the reservoir;
receiving, at the computing system, data relating to a quantity of proven reserves to be created by the modification and a net present value (NPV) of the modification; and
calculating, using the one or more processors, a true value index (TVI) for the modification based on the NPV of the modification and the reservoir management factor (β); and
implementing the modification of production units at the petroleum reservoir to increase petroleum production/recovery efficiency of the petroleum reservoir, wherein the increase in petroleum production/recovery efficiency corre, wherein the production units are selected from one or more of producing oil wells, water injection wells, gas injection wells, heat injectors, or subcomponents thereof.

* * * * *